350-427   SR
OR   3,619,035

United States

[11] 3,619,035

| [72] | Inventor | Harold Horace ...<br>Barnet, England |
|---|---|---|
| [21] | Appl. No. | 793,701 |
| [22] | Filed | Jan. 24, 1969 |
| [45] | Patented | Nov. 9, 1971 |
| [73] | Assignee | W. Watson & Sons, Limited<br>Barnet, England |
| [32] | Priority | Jan. 25, 1968 |
| [33] | | Great Britain |
| [31] | | 4026/68 |

[54] ZOOM LENS SYSTEM FOR MAINTAINING TWO
PAIRS OF CONJUGATE PLANES FIXED
4 Claims, 4 Drawing Figs.

[52] U.S. Cl......................................................... 350/184,
350/13, 350/43, 350/50
[51] Int. Cl......................................................G02b 15/14,
G02b 21/14
[50] Field of Search........................................... 350/40–44,
184, 186

[56] References Cited
UNITED STATES PATENTS

| 2,209,532 | 7/1940 | Michel ....................... | 350/184 UX |
| 3,057,259 | 10/1962 | Schuma...................... | 350/184 |
| 3,185,029 | 5/1965 | Peck et al. ................. | 350/184 |
| 3,353,891 | 11/1967 | Rosenberger ............. | 350/184 X |
| 3,421,807 | 1/1969 | Nothnagel et al........... | 350/184 X |

Primary Examiner—John K. Corbin
Attorney—Watson, Cole, Grindle & Watson

ABSTRACT: A zoom lends system has three movable lens components and means for moving each lens component relative to the other two in such a way that two pairs of conjugate planes remain fixed in position throughout the range of magnification. The zoom system may be used in zoom microscopes and phase contrast microscopy. One pair of fixed conjugate planes is used for object and image positions and the other pair for an aperture stop and phase-changing device. One such zoom system may be used between the objective and eyepiece and another in the substage assembly.

PATENTED NOV 9 1971

Inventor
Harold Horace Hopkins
BY Watson, Cole Grindle & Watson
Attorneys

ZOOM LENS SYSTEM FOR MAINTAINING TWO PAIRS OF CONJUGATE PLANES FIXED

The invention relates to optical apparatus and in particular to zoom lens systems.

The invention provides a variable-magnification zoom lens system comprising at least three lens components each of which is movable, and movable relative to the other two, and means for moving all three lens components so that the system provides two pairs of conjugate planes which remain fixed in position as the magnification of the zoom system is changed, one pair of fixed conjugate planes forming the object and image planes.

Preferably the entrance and exit pupils of the system lie near or more preferably at the other pair of fixed conjugate planes.

The means for moving the lenses is arranged so that as the magnification of the zoom system is changed, the relations $$K = M/L' - 1/ML$$

and $$DK = PK + (M-1)^2/M$$

are substantially satisfied where $K$, $M$, $L$, $L'$, $D$ and $P$ are defined as $L$ is the distance from the fixed object plane to the fixed entrance pupil plane,
$L'$ is the distance from the fixed image plane to the fixed exit pupil plane,
$p$ is the distance from the object plane to the image plane,
$K$ is the equivalent power of the zoom system when the magnification is $M$, and
$D$ is the distance between the principal planes of the zoom system when the magnification is $M$.

It is readily possible from these expressions for $K$ and $DK$ to determine the interlens spacings $d_{12}$ between the front and center lens components and $d_{23}$ between the center and rear lens components by well-known Gaussian optical theory. It may be shown that $$K = K_1 + K_2 + K_3 - dK_1K_3 - (d_{12}K_1 + d_{23}K_3)K_2 + d_{12}d_{23}K_1K_2K_3$$

and $$DK = -d^2K_1K_3 - (d_{12}^2K_1 + d_{23}^2K_3)K_2 + dd_{12}d_{23}K_1K_2K_3$$

where $d = d_{12} + d_{23}$
and $K_1$, $K_2$ and $K_3$ are the powers of the first, second and third lens components respectively.

Having determined the interlens spacings, the positions of the lens with respect to the fixed points may readily be determined from the expression $$l_1 = (1/M = 1)F - \delta$$

where $l_1$ is the distance of the first (front) lens from the fixed object plane, and $\delta$ is the distance of the first principal plane of the system from the first lens and where $F = 1/K$.

Preferably the lens system consists of three moving components, the front and rear of which are of positive powers and of equal focal length, and the center component of negative power, and all three arranged to move such that $$d = \frac{2F_1}{2\gamma - M_1(M_1\gamma + 2)\left(M + \frac{1}{M}\right)} \left\{ \left[ M_1^3\gamma + M_1^2(4-\gamma) + M_1\left(\gamma + \frac{4}{\gamma} - 2\right) + 1 \right] \left[ M + \frac{1}{M} \right] + 2(\gamma - 1) \right\}$$

and $$d_{12}d_{23} = \frac{F_1^2}{\gamma} \left[ 2 - \frac{d}{F_1} - \frac{M_1(M_1\gamma + 2)\left(M + \frac{1}{M}\right)}{2} \right] F_1^2 + dF_1$$

where $d$, $d_{12}$, $d_{23}$, $F_1$, $M_1$ and $\gamma$ are defined as set out above.

The invention includes a microscope for forming an image of an object which microscope includes a zoom lens system as aforesaid between the microscope objective and eyepiece. The microscope may be a phase contrast microscope.

Preferably the phase contrast microscope has a phase-changing device between the object position and the eyepiece substantially at one plane of the said other pair of fixed conjugate planes of the said zoom lens system, and a light-controlling aperture between a light source and the object position, for controlling the light incident on the said phase-changing device from the object, said aperture being imaged substantially at the other plane of the said other pair of fixed conjugate planes of the said zoom system.

Preferably a further zoom system is provided between the light-controlling aperture and the object position for varying the magnification of the image of the aperture.

Preferably the further zoom system is a zoom system as aforesaid having two pairs of fixed conjugate planes.

A specific embodiment of the invention will now be described by way of example and with reference to the accompanying drawings, in which.

Figure 1:
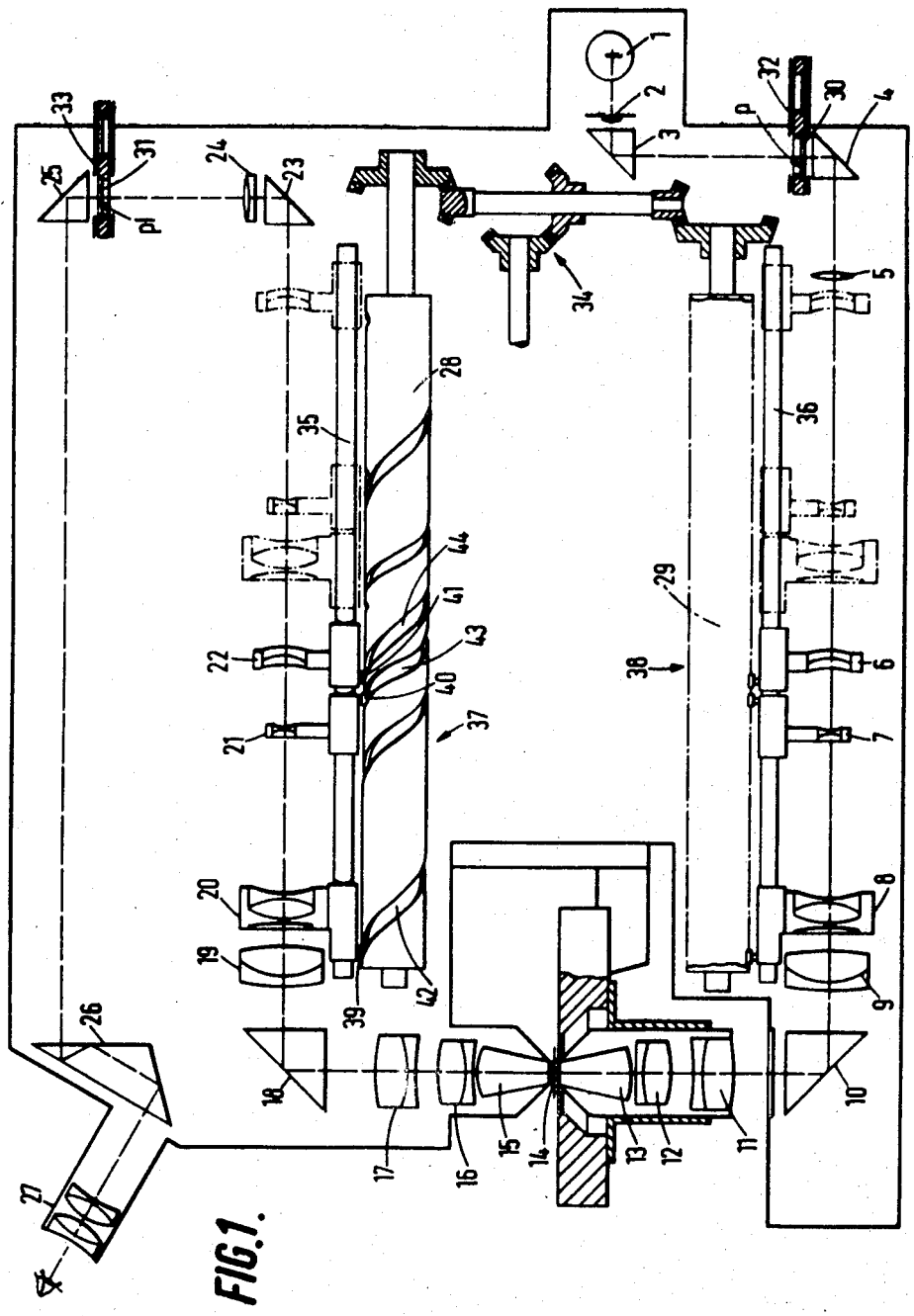
FIG. 1 shows a mechanical arrangement in a microscope for phase contrast work in accordance with the invention.

The embodiment illustrated in FIG. 1 shows a variable-magnification microscope with provision for phase contrast or similar viewing throughout its range of magnification. Light from a light source 1 passes through a lens 2, is reflected by prisms 3 and 4 and passes through lens 5 and the three movable lenses 6, 7, 8 which form part of a substage zoom system 38. The light then passes through the fixed lens 9, is reflected by prism 10 and is brought to focus on the object to be viewed by the further lenses 11, 12, and 13. Light scattered by the object 14 is picked up by the objective which consists of the lenses 15, 16, 17 and 19. The light is reflected by the prism 18 between lenses 17 and 19. The light then passes through the three movable lenses 20, 21 and 22 which form a viewing zoom system 37, is reflected by prism 23, passes through lens 24, is reflected by prisms 25 and 26, and forms an image of the object 14, to be viewed by the eyepiece 27.

The two zoom systems, 37 in the viewing half of the microscope and 38 in the substage illuminating system, are similar and the system 37 will be described in greater detail. The two systems are coupled by gears and shafts 34 so that they both move in unison. The zoom system 37 consists of three lenses 20, 21 and 22 (each consisting of a plurality of components) in mounts slidably mounted on a fixed rod 35 the focal length of lens 20 being equal to that of lens 22, both being positive; lens 21 is of different focal length and negative. The lenses 20, 21 and 22 are arranged to be moved in such a way that two pairs of conjugate planes remain fixed as the magnification of the system is varied. The mounts have projecting pins 39, 40, 41, which engage in helical grooves 42, 43, 44 respectively, so that when the shaft 28 is rotated, the mounts with the lenses 20, 21 and 22 are constrained to move along the rod 35 in such a way that the positions of the lenses 20, 21 and 22 are such that the following equations are satisfied.

$$d = \frac{2F_1}{2\gamma - M_1(M_1\gamma + 2)\left(M + \frac{1}{M}\right)} \left\{ \left[ M_1^3\gamma + M_1^2(4-\gamma) + M_1\left(\gamma + \frac{4}{\gamma} - 2\right) + 1 \right] \left[ M + \frac{1}{M} \right] + 2(\gamma - 1) \right\}$$

and $$d_{12}d_{23} = \frac{F_1^2}{\gamma} \left[ 2 - \frac{d}{F_1} - \frac{M_1(M_1\gamma + 2)\left(M + \frac{1}{M}\right)}{2} \right] F_1^2 + dF_1$$

where $d_{12}$ is the distance between the front and center lenses, $d_{23}$ is the distance between the center and the rear lenses, $d$ is the sum of these separations ($d_{12}+d_{23}$), (it being understood that $d_{12}$ and $d_{23}$ are measured in accordance with the usual convention in gaussian optics, as customary in optical theory, between the appropriate principal planes of the different components), $F_1$ the focal length of the front lens ($F_1=F_3$ the focal length of the rear lens), $M$ the magnification of the zoom lens system for one pair of fixed conjugate planes, $M_1$ the magnification of the front lens 20 when the magnification of the zoom system is $-1$ for the same pair of fixed conjugate planes, and where $\gamma=-F_1/F_2$ where $F_2$ is the focal length of the center lens (and is negative).

Figure 2A:
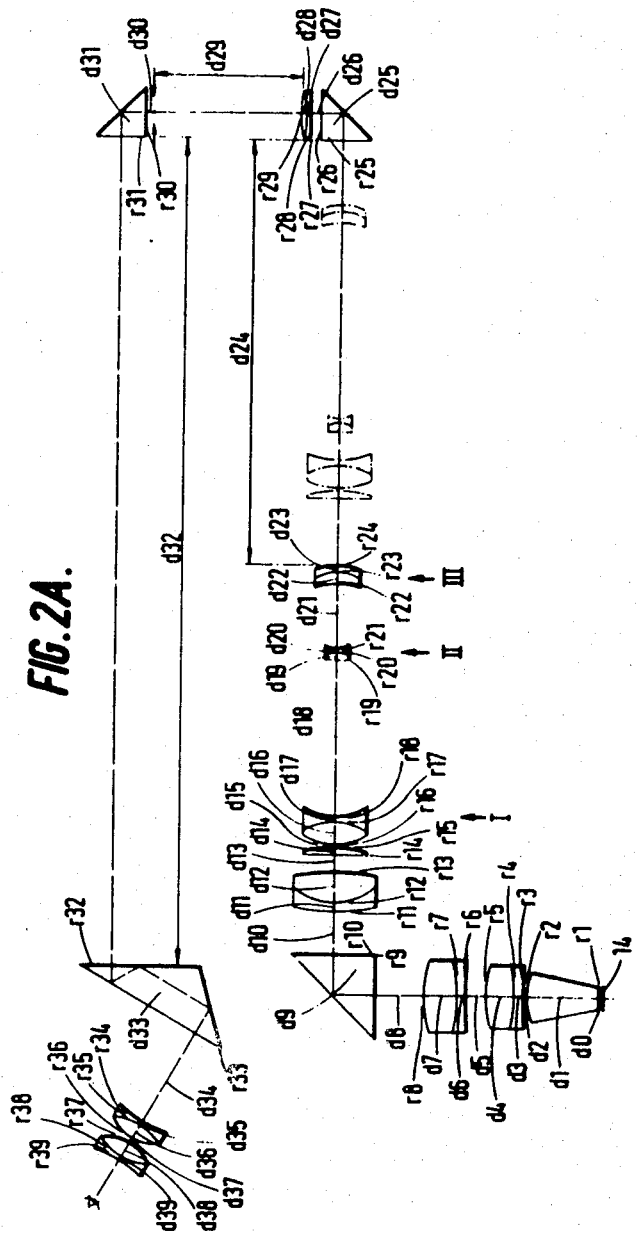
FIGS. 2A and 2B show in conjunction with table 1, the detailed values for the lens components in the same embodiment as FIG. 1.
Figure 2B:
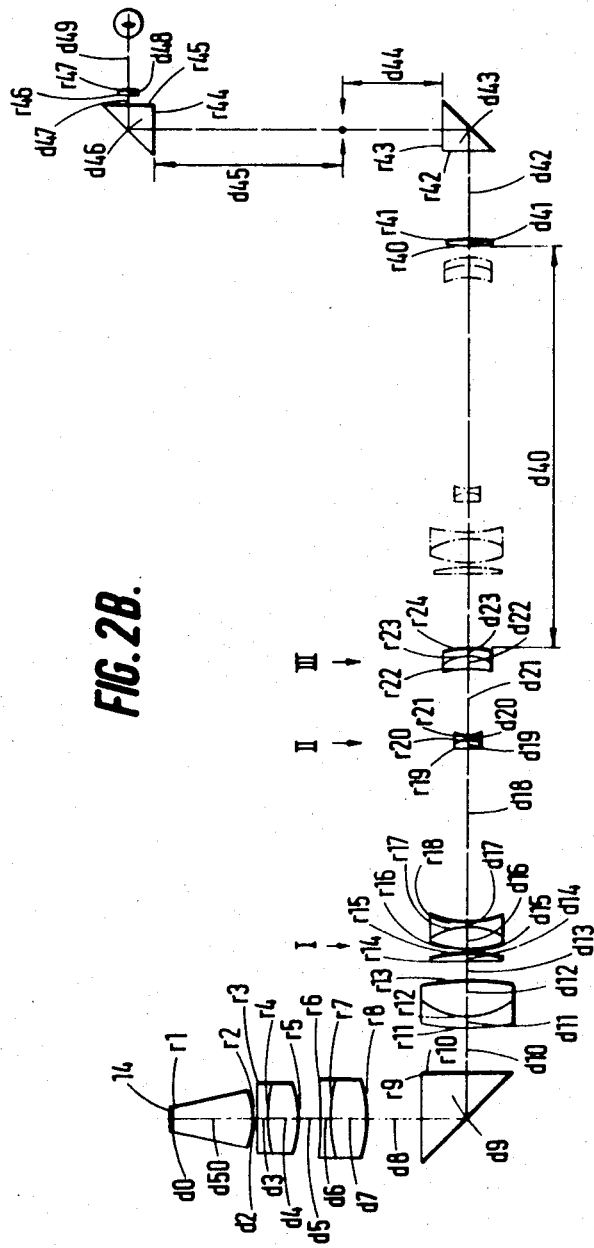

FIGS. 2A and 2B show the lens components of the microscope illustrated in FIG. 1 and should be joined together at the object 14 as is clear from FIG. 1.

FIGS. 2A and 2B show in conjunction with table 1 below, the radii of curvature, spacings, refractive indices, dispersive powers and diameters of all the lens components. Table 2 below gives a few specific values for the variable spacings. All distances are given in centimeters.

TABLE 1

| Radius of curvature | Distance | Refractive Index | Dispersive Index | Diam. |
|---|---|---|---|---|
| $r_1 = \infty$ | $d_0 = .07$ | Air | | 1.0 |
| $r_2 = -2.692$ | $d_1 = 3.7$ | 1.5891 | 61.2 | 2.0 |
| $r_3 = -36.311$ | $d_2 = 0.1$ | Air | | |
| $r_4 = +12.367$ | $d_3 = .15$ | 1.6479 | 33.8 | 3.2 |
| $r_5 = -5.203$ | $d_4 = 1.4$ | 1.6204 | 60.3 | |
| $r_6 = -62.035$ | $d_5 = 0.1$ | Air | | |
| $r_7 = +6.222$ | $d_6 = .15$ | 1.6479 | 33.8 | 3.6 |
| $r_8 = -8.727$ | $d_7 = 1.65$ | 1.5165 | 64.2 | |
| $r_9 = \infty$ | $d_8 = 2.5$ | Air | | |
| $r_{10} = \infty$ | $d_9 = 1.2$ | 1.5190 | 60.4 | 1.2 |
| $r_{11} = +19.153$ | $d_{10} = 2.0$ | Air | | 1.2 |
| $r_{12} = +6.480$ | $d_{11} = .15$ | 1.6889 | 31.2 | |
| $r_{13} = -13.732$ | $d_{12} = 1.65$ | 1.5190 | 60.4 | 4.2 |
| $r_{14} = \infty$ | $d_{13} = $ Variable | Air | | |
| $r_{15} = -7.852$ | $d_{14} = .305$ | 1.5190 | 60.4 | |
| $r_{16} = +3.348$ | $d_{15} = .051$ | Air | | 3.3 |
| $r_{17} = -3.173$ | $d_{16} = .118$ | 1.5722 | 57.7 | |
| $r_{18} = +5.980$ | $d_{17} = .305$ | 1.6479 | 33.8 | |
| $r_{19} = -12.948$ | $d_{18} = $ Variable | Air | | |
| $r_{20} = -0.840$ | $d_{19} = .432$ | 1.61323 | 36.9 | 1.2 |
| $r_{21} = +1.592$ | $d_{20} = .152$ | 1.5891 | 61.2 | |
| $r_{22} = +1.384$ | $d_{21} = $ Variable | Air | | |
| $r_{23} = -1.810$ | $d_{22} = .610$ | 1.5174 | 52.2 | 2.2 |
| $r_{24} = -6.086$ | $d_{23} = .254$ | 1.6997 | 35.0 | |
| $r_{25} = \infty$ | $d_{24} = $ Variable | Air | | |
| $r_{26} = \infty$ | $d_{25} = 2.3$ | 1.5190 | 60.4 | 2.3 |
| $r_{27} = +27.86$ | $d_{26} = 0.4$ | Air | | |
| $r_{28} = +7.28$ | $d_{27} = .25$ | 1.6258 | 35.7 | 2.3 |
| $r_{29} = -14.34$ | $d_{28} = .25$ | 1.5190 | 60.4 | |
| Stop | $d_{29} = 7.37$ | Air | | 1.5 |
| $r_{30} = \infty$ | $d_{30} = 0.4$ | Air | | |
| $r_{31} = \infty$ | $d_{31} = 2.3$ | 1.5190 | 60.4 | 2.3 |
| | $d_{32} = 42.4$ | Air | | |

TABLE 1

| Radius of curvature | Distance | Refractive Index | Dispersive Index | Diam. |
|---|---|---|---|---|
| $r_{32} = \infty$ | $d_{32} = 8.2$ | 1.5190 | 60.4 | |
| $r_{33} = \infty$ | $d_{33} = 5.2$ | Air | | |
| $r_{34} = -7.74$ | $d_{34} = .22$ | 1.6989 | 30.0 | 2.8 |
| $r_{35} = +2.8$ | $d_{35} = .9$ | 1.6204 | 60.3 | |
| $r_{36} = -2.16$ | $d_{36} = .05$ | Air | | |
| $r_{37} = +2.16$ | $d_{37} = .9$ | 1.6204 | 60.3 | 2.8 |
| $r_{38} = -2.8$ | $d_{38} = .22$ | 1.6989 | 30.0 | |
| $r_{39} = +7.74$ | $d_{39} = $ Variable | Air | | |
| $r_{40} = +11.5$ | $d_{40} = .25$ | 1.5190 | 60.4 | 2.2 |
| $r_{41} = -11.5$ | $d_{41} = .4$ | Air | | |
| $r_{42} = \infty$ | $d_{42} = 2.3$ | 1.5190 | 60.4 | 2.3 |
| $r_{43} = \infty$ | $d_{43} = 4.5$ | Air | | |
| Stop | $d_{44} = 8.5$ | Air | | 0.9 |
| $r_{44} = \infty$ | $d_{45} = 2.3$ | 1.5190 | 60.4 | 2.3 |
| $r_{45} = \infty$ | $d_{46} = 0.4$ | Air | | |
| $r_{46} = 2.0$ | $d_{47} = 0.2$ | 1.5190 | 60.4 | 1.0 |
| $r_{47} = -3.2$ | $d_{48} = 3.0$ | Air | | |
| Filament | | | | 0.28 |

TABLE 2.—VALUES OF THE VARIABLE SEPARATIONS IN CMS.

| | $d_{13}$ | $d_{18}$ | $d_{21}$ | $d_{24}$ | $d_{39}$ | |
|---|---|---|---|---|---|---|
| 1 | .81 | 7.748 | 3.106 | 21.06 | 18.34 | Low magnification. |
| 2 | 5.605 | 5.248 | 4.122 | 17.749 | 15.029 | |
| 3 | 10.574 | 3.653 | 5.372 | 13.125 | 10.405 | Mean. |
| 4 | 15.198 | 2.403 | 6.967 | 8.156 | 5.436 | |
| 5 | 18.509 | 1.387 | 9.467 | 3.361 | .641 | High magnification. |

Figure 3:
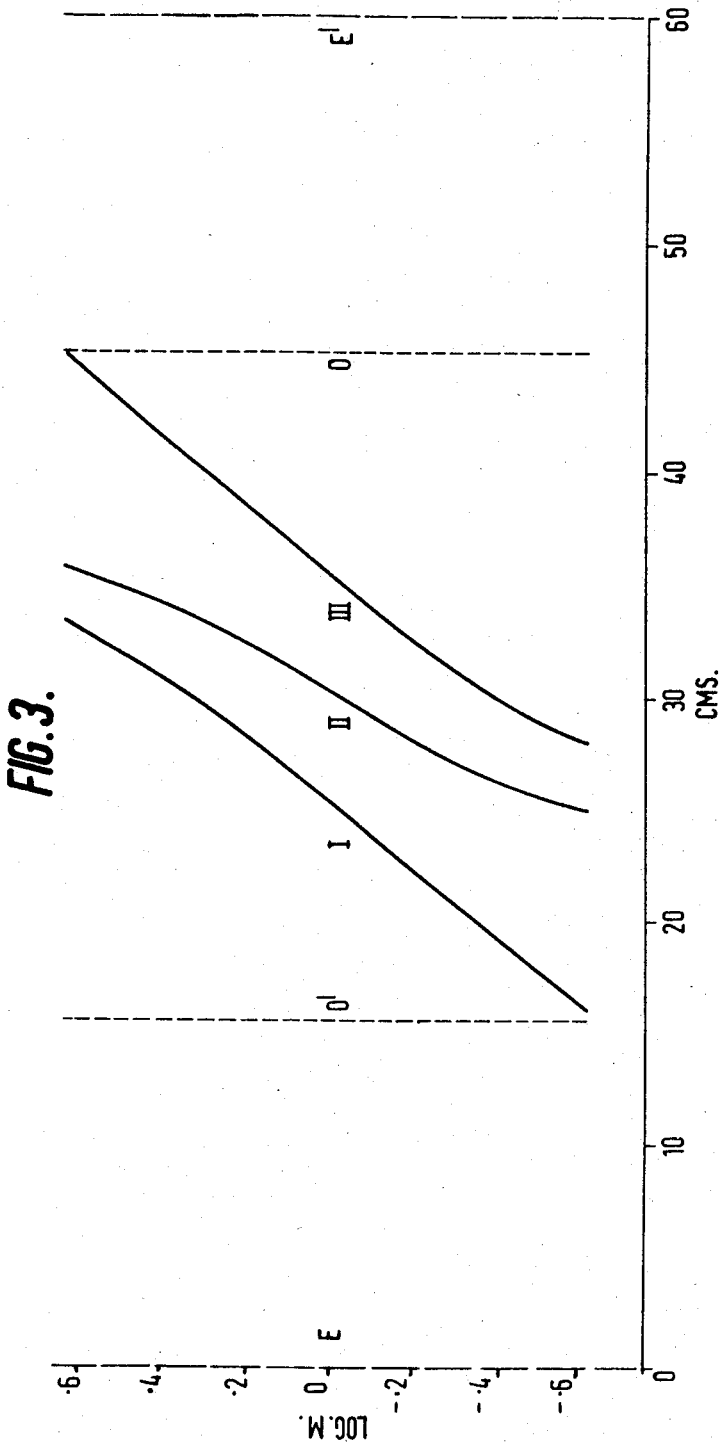
FIG. 3 is a graph of the position of each of the three movable lens components against the logarithm of the magnification.

FIG. 3 is a graph showing how each of the three movable lenses move in relation to change in magnification of the zoom system 37 or 38 shown in FIG. 1. 0 is the fixed (virtual) object plane, 0' the fixed (virtual) image plane and E and E' are respectively the fixed entrance and exit pupil planes. The curves I, II and III correspond to the movement of the components I, II, III respectively shown in FIG. 2A or the components I, II, III in the substage shown in FIG. 2B. The graph shows the logarithm of the magnification of the zoom lens system plotted against the positions of the lens components. All three lenses move in the same direction as the magnification is increased throughout its range. Very high zoom ratios are possible with this example. In this example the ratio is 20:1.

In both zoom systems 37 and 38, all three lenses 20, 21, 22 (and 6, 7, 8) are movable and movable relative to each other. They are arranged so that each zoom system provides two pairs of conjugate planes which remain fixed in position as the magnification is changed. One pair of fixed conjugate planes being the object and image planes and the other pair being at the entrance and exit pupils. Either pair of fixed conjugate planes may be made the object and image planes or the entrance and exit pupils.

In this example the magnification between the object and the image varies from a numerical value $R$ to the value $1/R$.

In the mean position for the preferred system when the overall magnification for one pair of fixed conjugate planes is equal to $-1$, the magnification of the front and rear lenses are reciprocals of each other and such that the magnification, $M_1$ for this pair of conjugate planes for the front positive lens satisfies the inequalities $M_1 < 0$; $|M_1| < 0.8$ In this example this pair of conjugate planes relates to the entrance and exit pupils and the other pair of fixed conjugate planes relates to the object and image planes. Also the numerical ratio $\delta$ is greater than 2.

A further condition that this system satisfies is that the sum of the numerical values of the powers of the outer lenses are less than the numerical value of the power of the middle component.

The lenses 20, 21 and 22 all move in the same direction as the magnification of the system is increased throughout its range.

An advantage of this zoom lens system is that the resolution of the zoom lens system increases with the magnification and the system gives no "empty magnification."

The zoom lens system 38 mounted in the substage of the microscope is similar in all the above respects to the zoom system 37.

The microscope is fitted with a mounting means 32, at the entrance pupil of the substage lens system 38 in which are mounted aperture stops required for ordinary, phase contrast, Rheinberg differential illumination etc. types of viewing. A similar mounting means 33 is fitted at the exit pupil of the system 37, in which are mounted the corresponding phase changing rings etc. 31 required for the different types of viewing. The mounting means 32 and 33 are both rotatable to select and insert the required components on the mountings into the optical path of the microscope. An image of the stop 30 formed by lenses 5 to 19, lies in the plane of one of the fixed conjugate positions (at the entrance pupil) of the zoom system 37, and will vary in size as the magnification of the zoom system 38 is varied. The zoom system 37 will produce a real image of the stop 30 at 31. Moreover, by the symmetry of the system, the image of the stop 30 formed at 31 will remain of constant size as the magnification of the microscope is varied since the size of the object (i.e. the image formed by lenses 5-19) of the zoom system 37 varies as the magnification of the microscope is adjusted. Thus the microscope may be used for phase contrast work, throughout its range of magnification.

A further advantage of this example is that the light from the source 1 is projected by the substage lens system onto that area of the object 14 being viewed by the viewing lens system. Thus as the magnification of the microscope is increased the brightness of the field of view presented to the observer remains substantially constant.

The invention is not restricted to the details of the foregoing example. For instance, the zoom systems may each have more than three lenses.

There are two general mathematical conditions given below which if satisfied by zoom systems with any number of movable lenses (but at least three) will provide two pairs of conjugate planes which remain fixed in position as the magnification is varied.

If light is assumed to be incident from the left and L represents the desired distance from the fixed object plane O to the fixed entrance pupil plane E and is positive or negative according as E is the the right or left of O, L' represents the desired distance from the fixed image plane O', to the fixed exit pupil plane E', and is positive or negative according as E' is to the right or left of O', P represents the desired distance from the object plane, O to the image plane O', M represents the magnification between the object at O and its image at O', and is positive or negative according as the image is erect or inverted, K represents the equivalent power of the zoom system, when the magnification has the value M, and D represents the distance between the principal planes of the zoom system when the magnification has the value M. Then the conditions are that $$K = M/L' - 1/ML$$

and $$DK = PK + (M-1)^2/M$$

It is the solution of these equations for the particular case having three movable lens components where the front and rear components are of equal focal length and of positive power and where the center component is of negative power, that provides the equation for the separations between the front and rear lens components and the equation for the product ($d_{12}d_{23a}$) of the separations between the front and center lens and center and rear lens given above.

I claim:

1. A variable-magnification zoom lens system comprising three lens components each of which is arranged to be movable and movable relative to the other two displacement means for simultaneously moving the lens components, the means for moving the lens components being arranged so that, as the magnification $M$ of the zoom system is changed, the relations $$K = M/L - 1/ML$$

and $$DK = PK + (M-1)^2/M$$

are substantially satisfied to maintain two pairs of conjugate planes fixed as the magnification is varied, one pair of conjugate planes forming the object and image planes, and the entrance and exit pupils lying at or near the other pair of conjugate planes, where $L$ is the distance from the fixed object plane to the fixed entrance pupil plane, $L'$ is the distance from the fixed image plane to the fixed exit pupil plane, $P$ is distance from the object plane to the image plane, $K$ is the equivalent power of the zoom system when the magnification is $M$, $D$ is the distance between the principal planes of the zoom system when the magnification is $M$.

2. A variable-magnification zoom lens system comprising at least three lens components of which three are movable and movable relative to one another, and means for moving all three movable lens components simultaneously, the front and rear movable components being of positive power and equal focal length and the center component being of negative power, the mean for moving the lens components being arranged to move all three simultaneously such that $$D = \frac{2F_1}{2\gamma - M_1(M_1\gamma+2)\left(M+\frac{1}{M}\right)} \left\{ \left[ M_1^3\gamma + M_1^2(4-\gamma) + M_1\left(\gamma+\frac{4}{\gamma}-2\right) + 1 \right] \left[ M+\frac{1}{M} \right] + 2(\gamma-1) \right\}$$

and $$d_{12}d_{23} = \frac{F_1^2}{\gamma}\left[ 2 - \frac{d}{F_1} - \frac{M_1(M_1\gamma+2)\left(M+\frac{1}{M}\right)}{2} \right] - F_1^2 + dF_1$$

where $d_{12}$ and $d_{23}$ are the interlens spacings between the front and center lens components and between the center and rear lens components respectively, $d = d_{12} + d_{23}$, $M$ is the magnification of the system, $F_1$ is the focal length of the front lens and is equal to $F_3$ the focal length of the rear lens, $M$ is the magnification of the front lens when the magnification of the zoom system is $-1$ for the same pair of fixed conjugate planes and where $\gamma = -F_1/F_2$ and when $F_2$ is the focal length of the center lens and is negative.

3. A variable-magnification zoom lens system comprising three lens components, each of which is movable, with means for simultaneously moving the lens components, the means for moving the lens components being arranged so that, as the magnification $M$ of the zoom system is changed, the relations $$K = M/L' - 1/ML$$

and $$DK = PK + (M-1)^2/M$$

are substantially satisfied to maintain two pairs of conjugate planes fixed as the magnification is varied, one pair of conjugate planes forming the object and image planes and exit pupils lying at or near the other pair of conjugate planes, where

- $L$ is the distance from the fixed object plane to the fixed entrance pupil plane,
- $L'$ is the distance from the fixed image plane to the fixed exit pupil plane,
- $P$ is the distance from the object plane to the image plane,
- $K$ is the equivalent power of the zoom system when the magnification is $M$,
- $D$ is the distance between the principal planes of the zoom system when the magnification is $M$, whereby the interlens spacings $d_{12}$ and $d_{23}$ between the first and second lens components and between the second and third lens components respectively are determinable from the equations $$K = K_1 + K_2 + K_3 - dK_1K_3 - (d_{12}K_1 + d_{23}K_3)K_2 + d_{12}d_{23}K_1K_2K_3$$

and $$DK = -d^2K_1K_3 - (d_{12}^2K_1 + d_{23}^2K_3)K_2 + dd_{12}d_{23}K_1K_2K_3$$

where $K_1, K_2$ and $K_3$ are the power of the first, second and third lens components respectively, and $$d = d_{12} + d_{23}.$$

4. A variable-magnification zoom lens system comprising a plurality of lens components with means for simultaneously moving three lens components the means for moving the lens components being arranged so that, as the magnification $M$ of the zoom system is changed, the relations $$K = M/L' - 1/ML$$

and $$DK = PK + (M-1)^2/M$$

are substantially satisfied to maintain two pairs of conjugate planes fixed as the magnification is varied, one pair of conjugate planes forming the object and image planes and the other pair of conjugate planes being the entrance and exit pupil planes, where

- $L$ is the distance from the fixed object plane to the fixed entrance pupil plane,
- $L'$ is the distance from the fixed image plane to the fixed exit pupil plane,
- $P$ is distance from the object plane to the image plane,
- $K$ is the equivalent power of the zoom system when the magnification is $M$,
- $D$ is the distance between the principal planes of the zoom system when the magnification is $M$, whereby the interlens spacings $d_{12}$ and $d_{23}$ between the first and second lens components and between the second and third lens components respectively are determinable from the equations $$K = K_1 + K_2 + K_3 - dK_1K_3 - (d_{12}K_1 + d_{23}K_3)K_2 + d_{12}d_{23}K_1K_2K_3$$

and $$DK = -d^2K_1K_3 - (d_{12}^2K_3)K_2 + dd_{12}d_{23}K_1K_{23}$$

where $K_1, K_2$ and $K_3$ are the powers of the first, second and third lens components respectively, and $$d = d_{12} + d_{23},$$

one said means for moving the lens being arranged so that the distance $l_1$ of the first lens from the fixed object plane is given by the relation $$l_1 = (1/M - 1)(F - \gamma)$$

where $\gamma$ is the distance of the first principal plane of the system from the fist lens and where $F = 1/K$.

* * * * *